(12) United States Patent
Cammenga et al.

(10) Patent No.: US 7,864,400 B1
(45) Date of Patent: Jan. 4, 2011

(54) VEHICLE REARVIEW MIRROR WITH SPOTTER MIRROR

(75) Inventors: David J. Cammenga, Zeeland, MI (US);
Brian J. Steenwyk, Holland, MI (US);
Michael L. McLarty, Holland, MI (US);
Randall S. Braun, Hudsonville, MI (US)

(73) Assignee: Gentex Corporation, Zeeland, MI (US)

( * ) Notice: Subject to any disclaimer, the term of this patent is extended or adjusted under 35 U.S.C. 154(b) by 29 days.

(21) Appl. No.: 12/488,947

(22) Filed: Jun. 22, 2009

(51) Int. Cl.
G02F 1/155 (2006.01)
G02F 1/15 (2006.01)
G02B 5/08 (2006.01)

(52) U.S. Cl. ............... 359/266; 359/265; 359/866

(58) Field of Classification Search ........... 359/265, 359/266, 267, 272, 864, 866, 872
See application file for complete search history.

(56) References Cited

U.S. PATENT DOCUMENTS

| | | | |
|---|---|---|---|
| 3,267,806 | A | 8/1966 | Azegami |
| 4,325,609 | A | 4/1982 | Alford |
| 4,674,850 | A | 6/1987 | Blom |
| 4,989,964 | A | 2/1991 | Meise |
| 5,005,962 | A | 4/1991 | Edelman |
| 5,166,833 | A | 11/1992 | Shyu |
| 6,032,323 | A | 3/2000 | Smith et al. |
| 6,315,419 | B1 | 11/2001 | Platzer, Jr. |
| 7,097,312 | B2 | 8/2006 | Platzer, Jr. |
| 7,748,856 | B2 * | 7/2010 | Zhao ................. 359/868 |
| 2010/0039691 | A1 * | 2/2010 | Thomas et al. ............. 359/267 |
| 2010/0220407 | A1 * | 9/2010 | Zhao .......................... 359/864 |

FOREIGN PATENT DOCUMENTS

| | | |
|---|---|---|
| DE | 2915521 | 10/1980 |
| DE | 003606020 | 8/1987 |
| DE | 003624321 | 2/1988 |
| DE | 003743072 | 7/1989 |
| JP | 355076721 | 6/1980 |
| JP | 555076721 | 6/1980 |
| JP | 491539 | 8/1992 |
| JP | 10086899 | 4/1998 |

OTHER PUBLICATIONS

U.S. Patent Application Publication No. 2008/0304170, published Dec. 11, 2008, inventor Zhao, entitled "Exterior Mirror Element With Integral Wide Angle Portion".

* cited by examiner

*Primary Examiner*—David N Spector
(74) *Attorney, Agent, or Firm*—Price, Heneveld, Cooper, DeWitt & Litton, LLP

(57) ABSTRACT

A mirror element comprising a front element, a rear element, electrochromic material therebetween, and a spotter optic located at the rear surface of the front element. At least a portion of the spotter optic has a first radius of curvature and at least a portion of the front surface of the front element has a greater second radius of curvature. A line perpendicular to the front surface extends through both the electrochromic material and the spotter optic. A first electrode coating and a second electrode coating are activated to activate the electrochromic material in order to dim a reflection off of the mirror element. A reflective coating of the spotter optic can form a portion of the first electrode coating. The first electrode coating and the reflective coating can overlap.

21 Claims, 8 Drawing Sheets

VEHICLE REARVIEW MIRROR WITH SPOTTER MIRROR

FIELD OF THE INVENTION

The present invention concerns vehicle mirrors, and more particularly relates to rearview mirrors having a spotter mirror.

BACKGROUND OF THE INVENTION

Electrochromic elements are used in a variety of applications including light shutters, variable attenuating optical filters, and architectural and vehicle windows. The most common application of electrochromic elements is in rearview mirror assemblies used in vehicles. Such electrochromic rearview mirrors are controlled to vary the reflectivity of the mirror in response to rearward and forward aimed light sensors so as to reduce the glare of headlamps in the image reflected to the driver's eyes.

SUMMARY OF THE PRESENT INVENTION

An aspect of the present invention is to provide an exterior rearview mirror element comprising a front element having a first front surface and a second rear surface, a rear element having a third front surface and a fourth rear surface, and electrochromic material located between the front element and the rear element. A seal abuts the front element and the second element, with the seal substantially surrounding the electrochromic material. A spotter optic is in contact with the electrochromic material. At least a portion of the spotter optic has a first radius of curvature and at least a portion of the first front surface has a second radius of curvature, with the first radius of curvature being smaller than the second radius of curvature.

Another aspect of the present invention is to provide an exterior rearview mirror element comprising a front element having a first front surface and a second rear surface, a rear element having a third front surface and a fourth rear surface, and electrochromic material located between the front element and the rear element. A spotter optic is located at the second rear surface of the front element, with the spotter optic having a reflective coating. At least a portion of the spotter optic has a first radius of curvature and at least a portion of the first front surface has a second radius of curvature, with the first radius of curvature being smaller than the second radius of curvature. An electrical potential is applied across a first electrode coating on the second surface and a second electrode coating on the third surface changing an absorption of the electrochromic material in order to reduce a reflection off of the exterior rearview mirror element. The reflective coating of the spotter optic forms a portion of the first electrode coating in contact with the electrochromic material.

Yet another aspect of the present invention is to provide an exterior rearview mirror element comprising a front element having a first front surface and a second rear surface, with the second rear surface having a first electrode coating thereon, a rear element having a third front surface and a fourth rear surface, with the third front surface having a second electrode coating thereon, and electrochromic material located between the front element and the rear element. A spotter optic is located at the second rear surface of the front element, with the spotter optic having a reflective coating. At least a portion of the spotter optic has a first radius of curvature and at least a portion of the first front surface has a second radius of curvature, with the first radius of curvature being smaller than the second radius of curvature. The first electrode coating and the reflective coating abut and overlap such that a line perpendicular to the first front surface of the front element extends through both the first electrode coating and the reflective coating.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
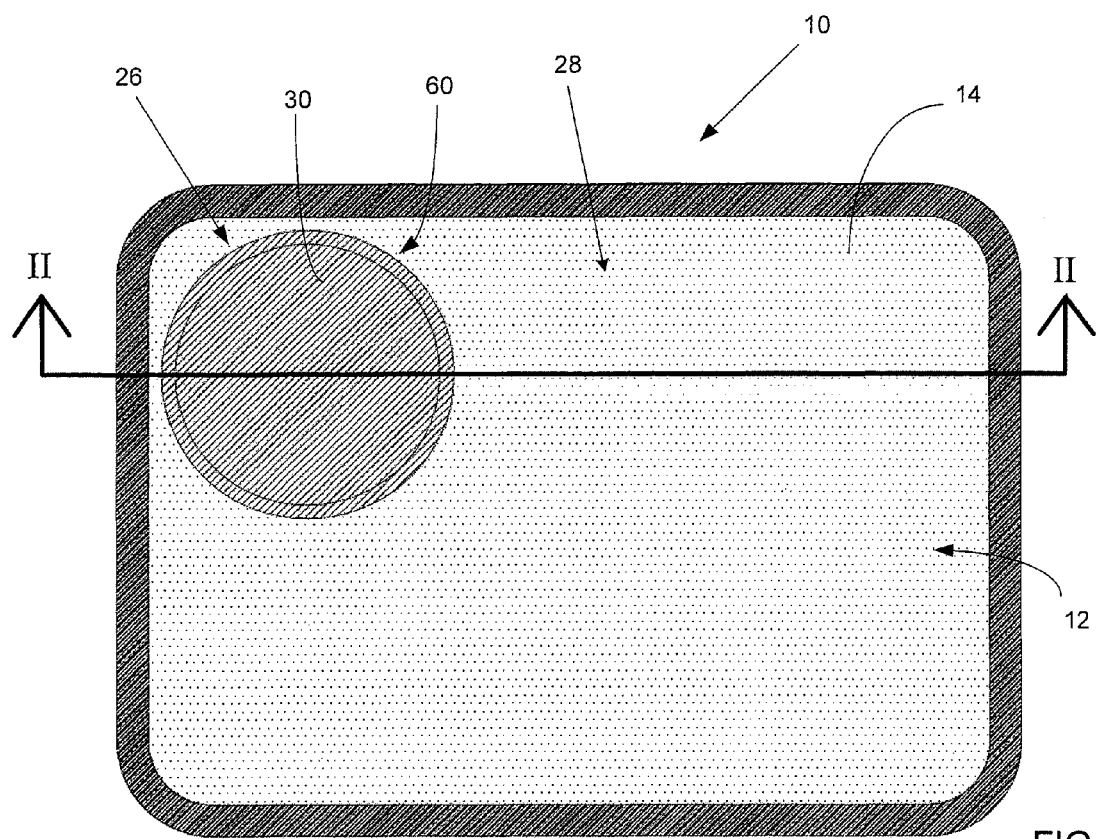
FIG. 1 is a front view of a first embodiment of an exterior rearview mirror element embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIGS. 1-3) generally designates an exterior rearview mirror element embodying the present invention. In the illustrated example, the exterior rearview mirror element 10 comprises a front element 12 having a first front surface 14 and a second rear surface 16 and a rear element 18 having a third front surface 20 and a fourth rear surface 22. The exterior rearview mirror element 10 further includes electrochromic material 24 located between the front element 12 and the rear element 18. The exterior rearview mirror element 10 also includes a spotter optic 26 in contact with the electrochromic material 24. The rearview mirror element 10 has a first area 28 not including the spotter optic 26 and a second area 30 including the spotter optic 26. The first area 28 reflects a first zone 32 and the second area 30 reflects a second zone 34, with the second zone 34 being different than the first zone 32. The exterior rearview mirror element 10 provides a driver of a vehicle with two images, with one image providing an area of view different than the area of view of the other image.

The illustrated exterior rearview mirror element 10 (FIGS. 1-2) includes the front element 12 and the rear element 18, with a layer of electrochromic (EC) material 24 therebetween. A top electrical conductor 40 and a bottom electrical conductor 42 are in electrical contact with opposing sides of the EC material 24 and are operably connected to a control circuit on a circuit board as is well known to those skilled in the art.

Figure 2:
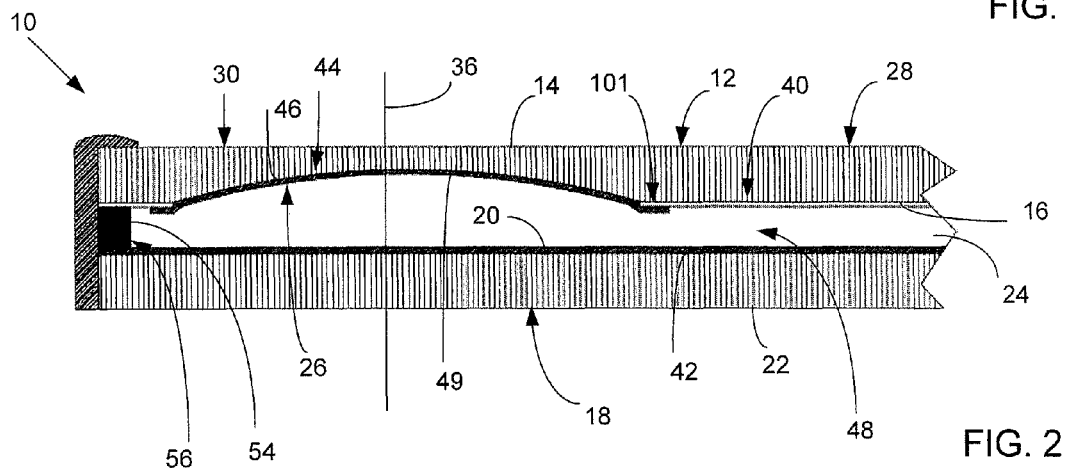
FIG. 2 is a cross-section view of the first embodiment of the exterior rearview mirror element embodying the present invention taken along the line II-II of FIG. 1.

FIGS. 1 and 2 illustrate the exterior rearview mirror element 10 constructed in accordance with a first embodiment of the present invention. A chamber 48 is defined by the top electrical conductor 40 (carried on the second rear surface 16), the bottom electrical conductor 42 (disposed on the third front surface 20), and an inner circumferential wall 54 of a sealing member 56. The EC medium 24 is contained within the chamber 48. As broadly used and described herein, the reference to an electrode, conductor or layer as being "carried" on a surface of an element refers to both electrodes or layers that are disposed directly on the surface of an element or disposed on another coating, layer or layers that are disposed directly on the surface of the element.

In the illustrated example, the front element 12 may be any material which is transparent and has sufficient strength to be able to operate in the conditions (e.g., varying temperatures and pressures) commonly found in the automotive environment. The front element 12 may comprise any type of borosilicate glass, soda lime glass, float glass, or any other material, such as, for example, a polymer or plastic, that is transparent in the visible region of the electromagnetic spectrum. The front element 12 is preferably a sheet of glass. The rear element 18 must meet the operational conditions outlined above, except that it does not need to be transparent in all applications, and therefore may comprise polymers, metals, glass, ceramics, and preferably is a sheet of glass. It is contemplated that the first front surface 14 of the front element 12 could include an anti-reflective coating thereon (over the entire surface or just a portion thereof (e.g., over the spotter optic 26)).

The bottom electrical conductor 42 on the third front surface 20 is sealably bonded to the top electrical conductor 40 on the rear second surface 16 in a spaced-apart and parallel relationship by the sealing member 56 disposed near an outer perimeter of both the second rear surface 16 and the third front surface 20. The sealing member 56 may be any material that is capable of adhesively bonding the coatings on the second rear surface 16 to the coatings on the third front surface 20 to seal the perimeter such that electrochromic material 24 does not leak from chamber 48. As described below, the top electrical conductor 40 and/or the bottom electrical conductor 42 may be removed over a portion where the sealing member 56 is disposed. In such a case, the sealing member 56 should bond well to glass.

The performance requirements for the sealing member 56 used in an electrochromic device are similar to those for a perimeter seal used in a liquid crystal device (LCD), which are well known in the art. The seal must have good adhesion to glass, metals and metal oxides; must have low permeabilities for oxygen, moisture vapor, and other detrimental vapors and gases; and must not interact with or poison the electrochromic or liquid crystal material it is meant to contain and protect. The perimeter seal can be applied by means commonly used in the LCD industry, such as by silk-screening or dispensing. Because of their lower processing temperatures, thermoplastic, thermosetting or UV curing organic sealing resins are preferred. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability and good solvent resistance, epoxy-based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional, and multi-functional epoxy resins and curing agents. Additives such as silanes, titanates, or sulfur or phosphorous compounds can be used to improve the seal's hydrolytic stability and adhesion, and spacers such as glass or plastic beads or rods can be used to control final seal thickness and substrate spacing. Suitable epoxy resins for use in the sealing member 56 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 354, 354LV, 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ, and 2P4MZ available from Shikoku Fine Chemicals, Tokyo, Japan; "ERISYS" DDA or DDA accelerated with U-405, 24EMI, U-410, and U-415 available from CVC Specialty Chemicals, Maple Shade, N.J.; and "AMICURE" PACM, 2049, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812 S, R202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z-6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif. The seal may be constructed in accordance with the teachings in U.S. Pat. Nos. 5,790,298 and 6,157,480, the entire disclosures of which are incorporated herein by reference.

Another suitable way to maintain precision spacing between the front element 12 and the rear element 18 is by adding plastic fibers to the sealing material 56. These fibers, if cut from monofilament in an aspect ratio of about 2.5 to 3 to 1 (length to diameter), are particularly effective in keeping the front element 12 and the rear element 18 from sliding during the seal cure process. The glass spheres act as ball bearings that can enable movement between the front element 12 and the rear element 18 during seal cure. Plastic fibers made of high temperature polyester (PEN) or polyetherimide (Ultem) when added to the sealing material 56 at around a 1% by weight loading help prevent movement of the front element 12 and the rear element 18 because they are randomly orientated and some will not be positioned to roll. These plastic spacers have another benefit in that they more closely match the thermal expansion of cured organic sealing material and consequently will generate less seal stress during thermal cycling.

The top electrical conductor 40 is deposited on the second rear surface 16 to act as an electrode. The top electrical conductor 40 is transparent and may be any material which bonds well to the front element 12, is resistant to corrosion to any materials within the exterior rearview mirror element 10, is resistant to corrosion by the atmosphere or road salts, has minimal diffuse or specular reflectance, high light transmission, near neutral coloration, and good electrical conductance. The top electrical conductor 40 may be fluorine-doped tin oxide, doped zinc oxide, indium zinc oxide ($ZN_3In_2O_6$), indium tin oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey-Owens-Ford Co. of Toledo, Ohio, other transparent conductive metal oxides, or other transparent conductors. Generally, the conductance of the top electrical conductor 40 will depend on its thickness and composition. IMI generally has superior conductivity compared with the other materials. IMI, however, is known to undergo more rapid environmental degradation and suffer from interlayer delamination. The thicknesses of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material (not shown) may be deposited between The top electrical conductor 40 and the second rear surface 16 to suppress the reflection of any unwanted portions of the electromagnetic spectrum.

The bottom electrical conductor 42 may be a combination reflector/electrode and is preferably disposed on the third front surface 20. The bottom electrical conductor 42 comprises at least one layer of a reflective material, which serves as a mirror reflectance layer and also forms an integral electrode in contact with and in a chemically and electrochemically stable relationship with any constituents in the electrochromic medium 24. The bottom electrical conductor 42 may be mostly reflective or may be partially transmissive/partially reflective (or "transflective") as disclosed in commonly-assigned U.S. patent application Ser. No. 10/115,860, filed on Apr. 3, 2002, entitled "ELECTROCHROMIC REARVIEW MIRROR ASSEMBLY INCORPORATING A DISPLAY/SIGNAL LIGHT," by William L. Tonar et al., now U.S. Pat. No. 6,700,692, the entire disclosure of which is incorporated herein by reference. As an alternative, exterior rearview mirror element 10 could incorporate a transparent conductive material on the third surface, which acts as an electrode, and incorporate a reflector on the fourth surface. However, combining the "reflector" and "electrode" and placing both on the third surface is preferred because it makes the device manufacture less complex and allows the device to operate with higher performance. The bottom electrical conductor 42 is a combined reflector/electrode on the third surface which generally has higher conductance than a conventional transparent electrode as used on the third surface. One can either change the composition of the top electrical conductor 40 on the second surface to one that has lower conductance (being cheaper and easier to produce and manufacture) while maintaining coloration speeds similar to that obtainable with a fourth surface reflector device, while at the same time decreasing substantially the overall cost and time to produce the electrochromic device. If, however, performance of a particular design is of utmost importance, a moderate to high conductance transparent electrode can be used on the second surface, such as, for example, ITO, IMI, etc. The combination of a high conductance (i.e., less than 250 preferably less than 15) reflector/electrode on the third surface and a high conductance transparent electrode on the second surface will not only produce an electrochromic device with more even overall coloration, but will also allow for increased speed of coloration and clearing. Furthermore, in fourth surface reflector mirror assemblies, there are two transparent electrodes with relatively low conductance, and in previously used third surface reflector mirrors, there is a transparent electrode and a reflector/electrode with relatively low conductance and, as such, a long buss bar on the front and rear element to bring current in and out is necessary to ensure adequate coloring speed. The bottom electrical conductor 42 of the present invention can be metallic and have a higher conductance and therefore has a very even voltage or potential distribution across the conductive surface, even with a small or irregular contact area, thereby providing greater design flexibility by allowing the electrical contact for the third surface electrode to be very small (if desired) while still maintaining adequate coloring speed.

It can be desirable in the construction of outside rearview mirrors to incorporate at least one thinner glass element in order to decrease the overall weight of the mirror so that the mechanisms used to manipulate the orientation of the mirror are not overloaded. Decreasing the weight of the device also improves the dynamic stability of the mirror assembly when exposed to vibrations. Alternatively, decreasing the weight of the mirror element may permit more electronic circuitry to be provided in the mirror housing without increasing the weight of the mirror housing. In the illustrated embodiment, the first substrate 12 comprises glass that is at least 2.0 mm in thick, although either thicker or thinner glass can be used. The thicker glass provides for a greater grind depths and a greater field of view for a given grind radius. To reduce the weight of the exterior rearview mirror element 10, the rear substrate 18 can comprise a piece of glass or other substrate that is thinner than the first substrate 12. The rear substrate 18 can be about 1.6 mm thick or less. More preferably, the rear substrate 18 can be about 1.1 mm or less. Thin glass may be prone to warpage or breakage, especially when exposed to extreme environments. This problem is substantially improved by using an improved electrochromic device incorporating two thin glass elements having an improved gel material. This improved device is disclosed in commonly assigned U.S. Pat. No. 5,940,201 entitled "ELECTROCHROMIC MIRROR WITH TWO THIN GLASS ELEMENTS AND A GELLED ELECTROCHROMIC MEDIUM," filed on Apr. 2, 1997. The entire disclosure of this patent is incorporated herein by reference. The addition of the bottom electrical conductor 42 that is a combined reflector/electrode onto the third front surface 20 of the exterior rearview mirror element 10 further helps remove any residual double imaging resulting from the two glass elements being out of parallel. Thus, the chamber 48 preferably contains a free-standing gel that cooperatively interacts with thin glass elements and to produce the exterior rearview mirror element 10 that acts as one thick unitary member rather than two thin glass elements held together only by a seal member. In free-standing gels, which contain a solution and a cross-linked polymer matrix, the solution is interspersed in a polymer matrix and continues to function as a solution. Also, at least one solution-phase electrochromic material is in solution in the solvent and therefore as part of the solution is interspersed in the polymer matrix (this generally being referred to as "gelled electrochromic medium"). This allows one to construct the exterior rearview mirror element 10 with thinner glass in order to decrease the overall weight of the exterior rearview mirror element 10 while maintaining sufficient structural integrity so that the exterior rearview mirror element 10 will survive the extreme conditions common to the automobile environment. This also helps maintain uniform spacing between the thin glass elements, which improves uniformity in the appearance (e.g., coloration) of the exterior rearview mirror element 10. This structural integrity results because the free-standing gel, the front element 12, and the rear element 18, which individually have insufficient strength characteristics to work effectively in an electrochromic mirror, couple in such a manner that they no longer move independently but act as one thick unitary member. This stability includes, but is not limited to, resistance to flexing, warping, bowing and breaking, as well as improved image quality of the reflected image, e.g., less distortion, double image, color uniformity, and independent vibration of each glass element. However, while it is important to couple the front element 12 and the rear element 18, it is equally important (if not more so) to ensure that the exterior rearview mirror element 10 functions properly. The free-standing gel must bond to the electrode layers (including the reflector/electrode if the mirror has a third surface reflector) on the walls of such a device, but not interfere with the electron transfer between the electrode layers and the electrochromic material(s) disposed in the chamber 48. Further, the gel must not shrink, craze, or weep over time such that the gel itself causes poor image quality. The device described above can ensure that the free-standing gel bonds well enough to the electrode layers to couple the front element 12 and the rear element 18 and does not deteriorate over time while allowing the electrochromic reactions to take place as though they were in solution.

To perform adequately, the exterior rearview mirror element 10 must accurately represent the reflected image, and this cannot be accomplished when the front element 12 and the rear element 18 tend to bend or bow while the driver is viewing the reflected image. The bending or bowing occurs mainly due to pressure points exerted by the mirror mounting and adjusting mechanisms and by differences in the coefficients of thermal expansion of the various components that are used to house the exterior mirror element. These components include a carrier plate used to attach the mirror element to the mechanism used to manipulate or adjust the position of the mirror (bonded to the mirror by an adhesive), a bezel, and a housing. Many mirrors also typically have a potting material as a secondary seal. Each of these components, materials, and adhesives has varying coefficients of thermal expansion that will expand and shrink to varying degrees during heating and cooling and will exert stress on the front element 12 and the rear element 18. On very large mirrors, hydrostatic pressure becomes a concern and may lead to double imaging problems when the front element 12 and the rear element 18 bow out at the bottom and bow in at the top of the exterior rearview mirror element 10. By coupling the front element 12 and the rear element 18, the thin/free-standing gel/thin element combination acts as one thick unitary member (while still allowing proper operation of the exterior rearview mirror element 10) and thereby reduces or eliminates the bending, bowing, flexing, double image, and distortion problems and non-uniform coloring of the electrochromic medium 24.

The cooperative interaction between the free-standing gel and the thin glass elements of the present invention also improves the safety aspects of exterior rearview mirror element 10 having thin elements. In addition to being more flexible, thin elements are more prone to breakage than thick elements. By coupling the free-standing gel with the thin elements, the overall strength is improved (as discussed above) and further restricts shattering and scattering and eases clean-up in the case of breakage of the exterior rearview mirror element 10.

The improved cross-linked polymer matrix used in the present invention is disclosed in commonly assigned U.S. Pat. No. 5,928,572 entitled "ELECTROCHROMIC LAYER AND DEVICES COMPRISING SAME" filed on Mar. 15, 1996. The entire disclosure of this patent is incorporated herein by reference.

A resistive heater 670 (see FIG. 12) may be disposed on the fourth rear surface 22 to heat the exterior rearview mirror element 10 and thereby clear the exterior rearview mirror element 10 of ice, snow, fog, or mist. The resistive heater may optionally be a layer of ITO, fluorine-doped tin oxide applied to the fourth surface, or may be other heater layers or structures well known in the art. It is contemplated that the rear fourth surface 22 of the rear element 18 could be flat or have a continuous radius without a depression to allow the heater to abut the rear elements 18 without any spacing and to allow the heater to easily abut the rear fourth surface 22.

An electrical circuit such as those taught in the above-referenced Canadian Patent No. 1,300,945 and U.S. Pat. Nos. 5,204,778, 5,434,407, 5,451,822, 6,402,328, and 6,386,713, is connected to and allows control of the potential to be applied across the top electrical conductor 40 and the bottom electrical conductor 42, such that electrochromic medium 24 will darken and thereby attenuate various amounts of light traveling therethrough and thus vary the reflectance of the exterior rearview mirror element 10 containing electrochromic medium 24. The electrical circuit used to control the reflectivity of the exterior rearview mirror element 10 preferably incorporates an ambient light sensor (not shown) and a glare light sensor (not shown), the glare light sensor being positioned either behind the exterior rearview mirror element 10 and looking through a section of the exterior rearview mirror element 10 with the reflective material completely or partially removed, or the glare light sensor can be positioned outside the reflective surfaces (e.g., in a bezel 58Z) or positioned behind a uniformly deposited transflective coating. Additionally, an area or areas of the electrode and reflector may be completely removed or partially removed to permit a vacuum fluorescent display, such as a compass, clock, or other indicia, to show through to the driver of the vehicle or as also described below, this light emitting display assembly can be shown through a uniformly deposited transflective coating. The present invention is also applicable to a mirror which uses only one video chip light sensor to measure both glare and ambient light and which is further capable of determining the direction of glare.

FIGS. 1 and 2 illustrate the first embodiment of the exterior rearview mirror element 10 of the present invention. In the first embodiment of the exterior rearview mirror element 10, the spotter optic 26 comprises a convex reflector 44 on the second rear surface 16 of the front element 12 (as viewed from the front of the exterior rearview mirror element 10). The convex reflector 44 includes a substantially spherical surface 46 having a reflective coating 49 thereon. As illustrated in FIG. 1, the convex reflector 44 defines the first area 28 of the exterior rearview mirror element 10 such that the first area 28 is smaller than the second area 30 of the exterior rearview mirror element 10. In the illustrated example, the spotter optic 26 has at least a portion thereof having a smaller radius of curvature than the radius of curvature of the first front surface 14 of the front element 12. For example, the spotter optic 26 can be substantially spherical or aspheric and the first front surface 14 can also be substantially spherical or aspheric, but with the first front surface 14 having a portion with a larger radius of curvature than the radius of curvature of the spotter optic. It is further considered that the first front surface 14 can be flat (radius of curvature=∞) and the spotter optic 26 can be substantially spherical or aspheric. Thus, it is contemplated that a first front surface 14 that is flat does have a radius of curvature, with the radius of curvature being infinity.

In the illustrated example, the reflective coating 49 can be conductive to form a portion of the top electrical conductor 40. Therefore, the electrochromic material 24 can darken behind the spotter optic 26 and below the spotter optic 26. However, the darkened electrochromic material 24 will not be viewed by the driver because of the reflective coating 49 will cover the electrochromic material 24. The reflective coating 49 or an optional the top electrical conductor 40 behind the reflective coating 49 allow the spotter optic 26 to contact the electrochromic material 24. Moreover, as illustrated in FIG. 2, it is contemplated that the reflective material 49 at a periphery 60 of the convex reflector 44 could overlap the top electrical conductor 40 at 101 (see FIG. 2) such that a line perpendicular 36 to the first front surface 14 of the front element 12 extends through both the top electrical conductor 40 and the reflective material 49. Therefore, the reflective material 49 could extend beyond the substantially spherical surface 46 and onto a portion of the remainder of the second rear surface 16. While the top electrical conductor 40 is illustrated as being located between the reflective material 49 and the second rear surface 16 of the front element 12 in FIG. 2, it is contemplated that the reflective material 49 could be located between the top electrical conductor 40 and the second rear surface 16 of the front element 12. It is also contemplated that the convex reflector 44 could overlap the top electrical conductor 40 (either above or below) by at least 0.5 mm and preferably by at least about 2 mm. Moreover, it is contemplated that the overlap of the convex reflector 44 and the top electrical conductor 40 encompasses substantially the entire periphery of the spotter optic 26.

Figure 3A:
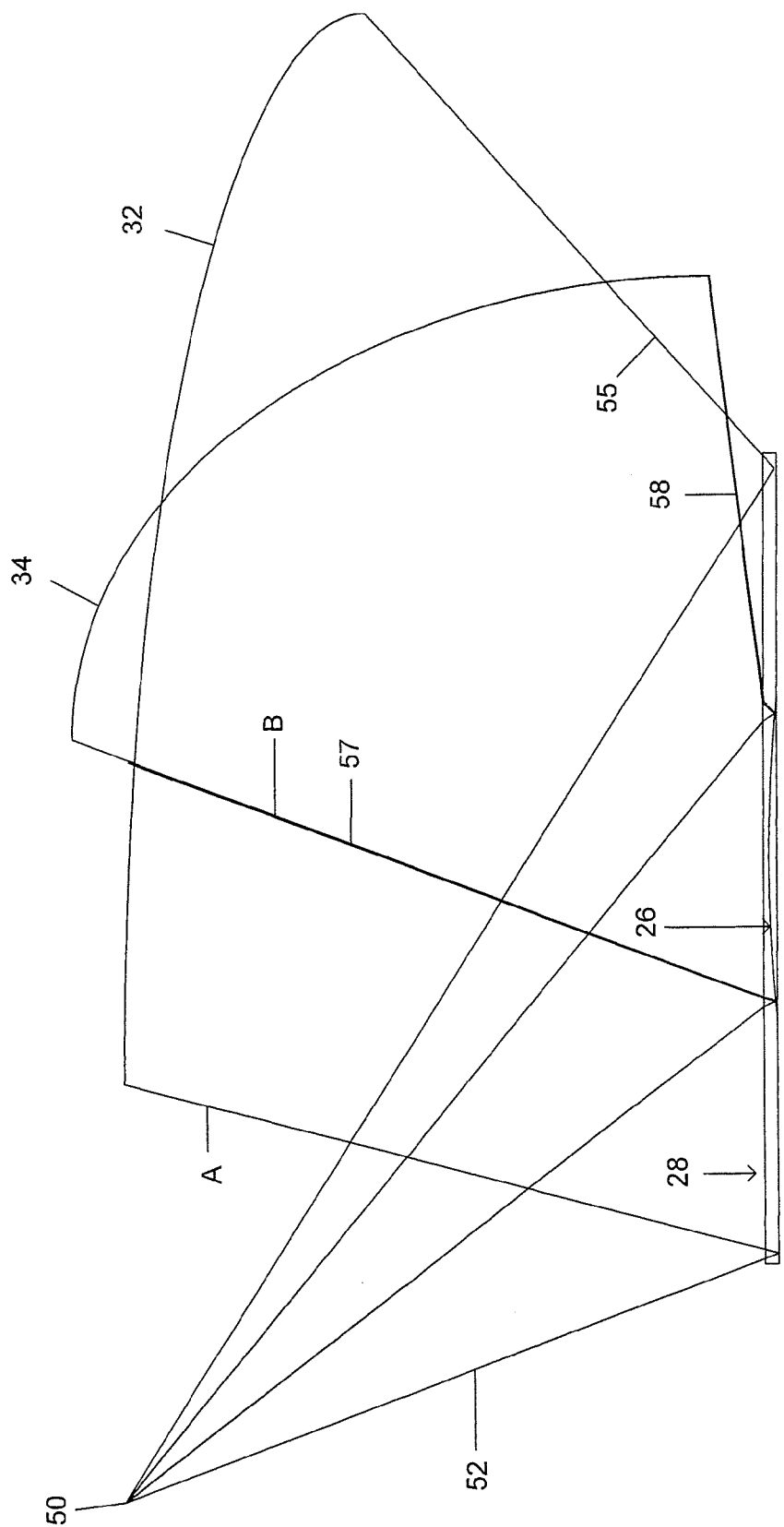
FIG. 3A is a schematic top view of the first embodiment of an exterior rearview mirror element embodying the present invention illustrating areas of reflection of the first embodiment of an exterior rearview mirror element embodying the present invention.

In the illustrated invention, the exterior rearview mirror element 10 provides the driver of a vehicle with the first zone 32 of reflection and the second zone 34 of reflection (see FIG. 3A). The first zone 32 of reflection is the typical reflection provided by an exterior side view mirror and allows the driver of the vehicle to see objects to the side and behind the vehicle within a first cone of reflection A. The second zone 34 of reflection allows the driver of the vehicle to see more objects to the side and behind the vehicle and/or a specific area (e.g., the ground by a door or blind spots) within a second cone of reflection B. The second cone of reflection B and the second zone 34 is different than the first cone of reflection A and the first zone 32.

As illustrated in FIG. 3A, a point of reference of the driver of the vehicle is represented by point 50. A first reflected line 52 represents an image reflected off of the exterior rearview mirror element 10 at a point closest to the driver at point 50. A second reflected line 55 represents an image reflected off of the exterior rearview mirror element 10 at a point furthest from the driver at point 50. As illustrated in FIG. 3A, the angle of incidence and the angle of reflection of each of lines 52 and 55 are approximately equal (although the angle of incidence and reflection of line 52 is different that the angle of incidence and reflection of line 55). A third reflected line 57 represents an image reflected off of the spotter optic 26 at a point closest to the driver at point 50. A fourth reflected line 58 represents an image reflected off of the spotter optic 26 at a point furthest from the driver at point 50. As illustrated in FIG. 3A, the angle of incidence of line 57 is smaller than the angle of reflection of line 57. Conversely, the angle of incidence of line 58 is larger than the angle of reflection of line 58. Therefore, the second cone of reflection B and the second zone 34 is different than the first cone of reflection A and the first zone 32. The spotter optic 26 therefore allows the driver to view an area around the vehicle in via the spotter optic 26 (the second area 30 of the exterior rearview mirror element 10) different than the remainder of the exterior rearview mirror element 10 (the first area 28 of the exterior rearview mirror element 10). It is noted that the light traveling through the front element 12 may experience some refraction, thereby enlarging the second cone of reflection B and the second zone 34 than they would be without any refraction (see below). It is further noted that FIG. 3A illustrates the reflection of images off of the exterior rearview mirror element 10 as taking place off of the second rear surface 16 of the front element 12 with the understanding that the images reflected in the first area 28 will in practice reflect off of the third front surface 20 or the fourth rear surface 22 of the rear element 18. However, reflection off of the third front surface 20 or the fourth rear surface 22 of the rear element 18 in practice will not substantially alter the first zone 32 as represented in FIG. 3A.

Figure 3B:
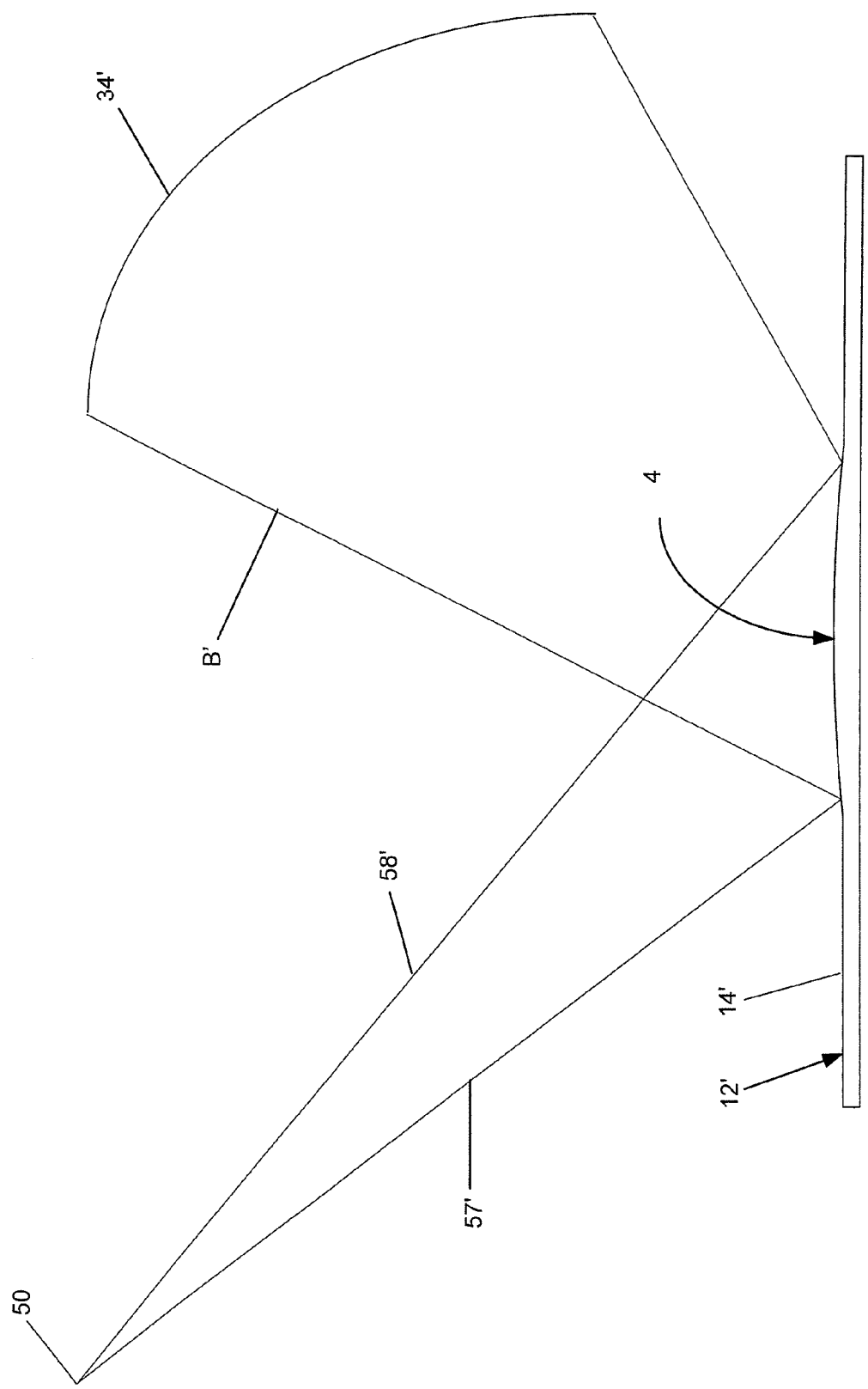
FIG. 3B is a schematic top view of a first surface spotter mirror illustrating areas of reflection.

FIG. 3B illustrates a reflected image from the point of reference of the driver of the vehicle is represented by point 50 off of a spotter mirror 4 on a front surface 14' of a first element 12'. FIGS. 3A and 3B illustrate the wider field of vision of the spotter optic 26 of the present invention compared to the spotter mirror 4 on the first front surface 14' of the first element 12'. As discussed above, FIG. 3A illustrates the third reflected line 57 and the fourth reflected line 58 as they reflect off of the spotter optic 26. FIG. 3B illustrates a first reflected line 57' that has the same angle from the point 50 to the spot that the reflected line 57' encounters the front surface 14' of the first element 12' as the third reflected line 57 from the point 50 in FIG. 3A. FIG. 3B also a second reflected line 58' that has the same angle from the point 50' to the spot that the reflected line 58' encounters the front surface 14' of the first element 12' as the fourth reflected line 58 from the point 50 in FIG. 3A. Comparing FIGS. 3A and 3B, the third reflected line 57 reflected off of the spotter optic 26 of the present invention has a smaller angle of reflection than the reflected line 57' reflected off of the spotter mirror 4. Furthermore, the fourth reflected line 58 reflected off of the spotter optic 26 of the present invention has a larger angle of reflection than the reflected line 58' reflected off of the spotter mirror 4. Therefore, the second cone of reflection B as illustrated in FIG. 3A is larger than the cone of reflection B' (the area between lines 57' and 58' of FIG. 3B) as illustrated in FIG. 3B. For example, it is contemplated that the spotter optic 26 of the present invention could include a 62° field of view while the spotter mirror 4 would only have a 33.6° field of view when the spotter optic 26 and the spotter mirror 4 have identical dimensions. The second cone of reflection B as illustrated in FIG. 3A is larger than the cone of reflection B' as illustrated in FIG. 3B because the light traveling through the first element 12 is refracted as illustrated in FIG. 3A. The first element 12 can therefore be constructed in such a way as to take advantage of the index of refraction of a transparent substrate to increase the effective field of view of a reflective surface without the need to increase the size of the reflecting surface or the need to decrease the radius of curvature on the reflective surface.

The examples as shown in FIGS. 3A and 3B illustrate that the exterior rearview mirror element 10 can be constructed in such a way as to take advantage of the index of refraction of the first element 12 to increase an effective field of view of the spotter optic 26 without the need to increase the size of the reflecting surface of the spotter optic 26 and/or the need to decrease a radius of curvature of the reflecting surface as compared to the spotter mirror 4 on the first front surface 14'. In other words, if the spotter optic 26 and the spotter mirror 4 have the same size of reflecting surface and the same radius of curvature, the spotter optic 26 will have a larger effective field of view. Nevertheless, variations of thickness of the first element 12, radius of curvature of the spotter optic 26, viewing distances (the distance between the point 50 and the spotter optic 26), location of the exterior rearview mirror element 10, index of refraction of the first element 12, etc. can be modified during design to optimize performance of the exterior rearview mirror element 10.

In the illustrated example, it is contemplated that the convex reflector 44 could include features to prevent distortion of the image reflected off of the convex reflector 44. Distortion of an image viewed at an edge of the convex reflector 44 can be caused by a change in radius of the substantially spherical surface 46 (e.g., at the intersection of the first front surface 14 of the front element 12 (having a substantially planar or a radius of curvature substantially larger than a radius of curvature of the substantially spherical surface 46) and the substantially spherical surface 46) and by a rate in change of the radius of curvature of the substantially spherical surface 46. It is contemplated that the first front surface 14 of the front element 12 could include a masking element (e.g., black dots) positioned over the periphery 60 of the convex reflector 44. It is also contemplated that the reflective coating 49 could be removed adjacent at edges of the convex reflector 44 and could also include no reflective material on the third front surface 20 or the fourth rear surface 22 of the rear element 18 behind the convex reflector 44 (to prevent any image from being reflected at the edge of the convex reflector 44). The masking element would prevent an image to be reflected off of the convex reflector 44 at the areas where distortion would occur.

The illustrated spotter optic 26 can also have characteristics different than the remainder of the exterior rearview mirror element 10. For example, the spotter optic 26 could have a different reflectance than the remainder of the exterior rearview mirror element 10. It is contemplated that the difference between the average reflectance in the spotter optic 26 and average reflectance of the remainder of the exterior rearview mirror element 10 is greater than approximately 5 percent. This provides a distinguishing characteristic between the two areas to prevent confusion to the driver. Moreover, the spotter optic 26 could have a different color than the remainder of the exterior rearview mirror element 10.

In the illustrated example, when the spotter optic 26 at the second rear surface 16 of the front element 12 has electrochromic material 24 behind the spotter optic 26, activation of the electrochromic material 24 behind the spotter optic 26 is relatively invisible compared to the activation of the electrochromic material 24 in the first area 28. However, there may however be effects that emanate from the spotter optic 26 affecting the first area 28. If there are concentrations of active anodic and cathodic materials in the electrochromic material 24 that form in imbalanced ratios in certain regions in the exterior rearview mirror element 10 during an extended period of darkening of the electrochromic material 24, the darkening of the electrochromic material 24 in the imbalanced regions may not erase as quickly as they would if they remained balanced. Moreover, with the area in the chamber 48 behind the spotter optic 24 being different in size than for the rest of the chamber 48, segregation of the electrochromic material 24 may more easily occur, leading to the imbalanced regions. The chamber 48 may be constructed so that the area in the chamber 48 behind the spotter optic 26 is relatively isolated from the rest of the chamber 48. In one embodiment, the area in the chamber 48 behind the spotter optic 26 is relatively isolated from the rest of the chamber 48 by adding additional seal material in the chamber 48 behind the periphery of the spotter optic 26 to substantially physically isolate the electrochromic material 26 behind the spotter optic 26 from the electrochromic material 26 in the remainder of the chamber 48. The additional seal material will restrict movement of the electrochromic material 24 and may substantially reduce segregation of the electrochromic material 24. It is contemplated that the additional seal material around the periphery of the spotter optic 26 does not have to fully encompass the area in the chamber 48 behind the spotter optic 26. It is also contemplated that the electrochromic material 24 in the area in the chamber 48 behind the spotter optic 26 and the rest of the chamber 48 are continuous. This allows the area in the chamber 48 behind the spotter optic 26 and the rest of the chamber 48 to fill with electrochromic material 24 in one fill process and through one opening in the seal 56. Alternatively, the area in the chamber 48 behind the spotter optic 26 and the rest of the chamber 48 could be completely isolated, requiring two fill processes. One skilled in the art will recognize that materials other than the seal material could be added around the periphery of the spotter optic 26 to substantially physically isolate the electrochromic material 26 behind the spotter optic 26 from the electrochromic material 26 in the remainder of the chamber 48.

It is contemplated that the first embodiment of the exterior rearview mirror element 10 with the spotter optic 26 of the present invention could be made in any manner. For example, the front element 14 could be formed in a fashion as described above and the substantially spherical surface 46 could be ground out of the second rear surface 16 of the front element 12. The substantially spherical surface 46 could be ground out of the second rear surface 16 of the front element 12 using grinding and polishing methods known in the art.

Figure 4:
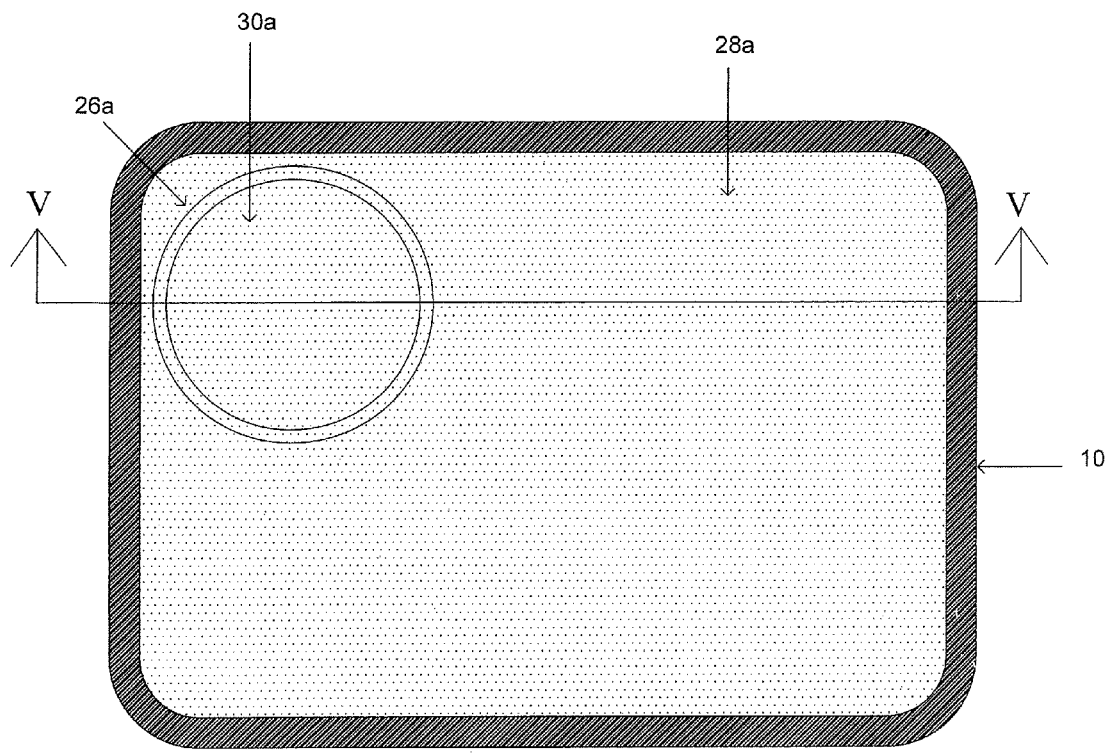
FIG. 4 is a front view of a second embodiment of an exterior rearview mirror element embodying the present invention.
Figure 5:
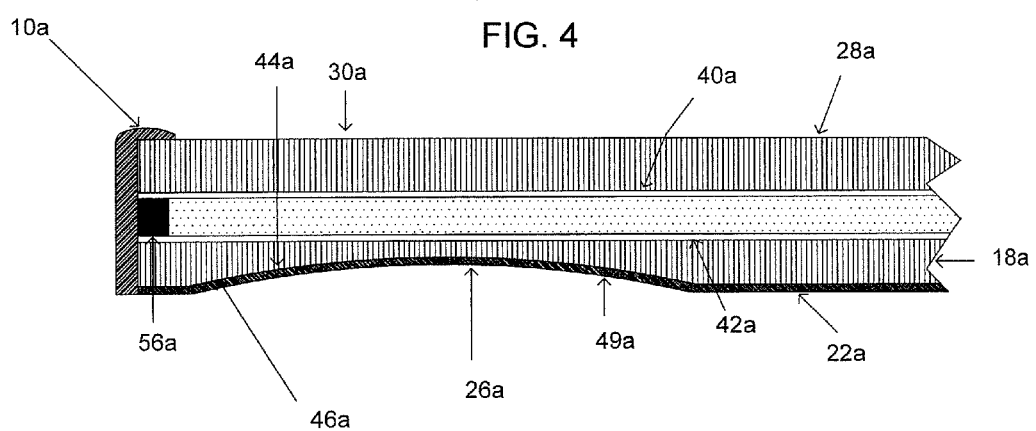
FIG. 5 is a cross-section view of the second embodiment of the exterior rearview mirror element embodying the present invention taken along the line V-V of FIG. 4.

The reference numeral 10a (FIGS. 4-5) generally designates another embodiment of the present invention, having a second embodiment for the exterior rearview mirror element. Since exterior rearview mirror element 10a is similar to the previously described exterior rearview mirror element 10, similar parts appearing in FIGS. 1-2 and FIGS. 4-5, respectively, are represented by the same, corresponding reference number, except for the suffix "a" in the numerals of the latter. The second embodiment of the exterior rearview mirror element 10a is substantially identical to the first embodiment of the exterior rearview mirror element 10, except that the spotter optic 26a comprises a convex reflector 44a on the fourth rear surface 22a of the rear element 18a (as viewed from the front of the exterior rearview mirror element 10a). The convex reflector 44a includes a substantially spherical surface 46a having a reflective coating 49a thereon. As illustrated in FIG. 4, the convex reflector 44a defines the first area 28a of the exterior rearview mirror element 10a such that the first area 28a is much smaller than the second area 30a of the exterior rearview mirror element 10a. It is noted that both the top electrical conductor 40a and the bottom electrical conductor 42a are transparent in the second embodiment of the exterior rearview mirror element 10a.

In the illustrated example, the substantially spherical surface 46a can be formed in the fourth rear surface 22a in the same manner as the substantially spherical surface 46 is formed in the second rear surface 16 of the first embodiment of the exterior rearview mirror element 10 as described above. Moreover, it is contemplated that the first front surface 14, the second rear surface 16 and/or the third front surface 20 could include a masking element (e.g., black dots) positioned over a periphery 60a of the convex reflector 44a and/or the reflective coating 49a could be removed adjacent at edges of the convex reflector 44a to prevent an image to be reflected off of the convex reflector 44a at the areas where distortion would occur.

Figure 6:
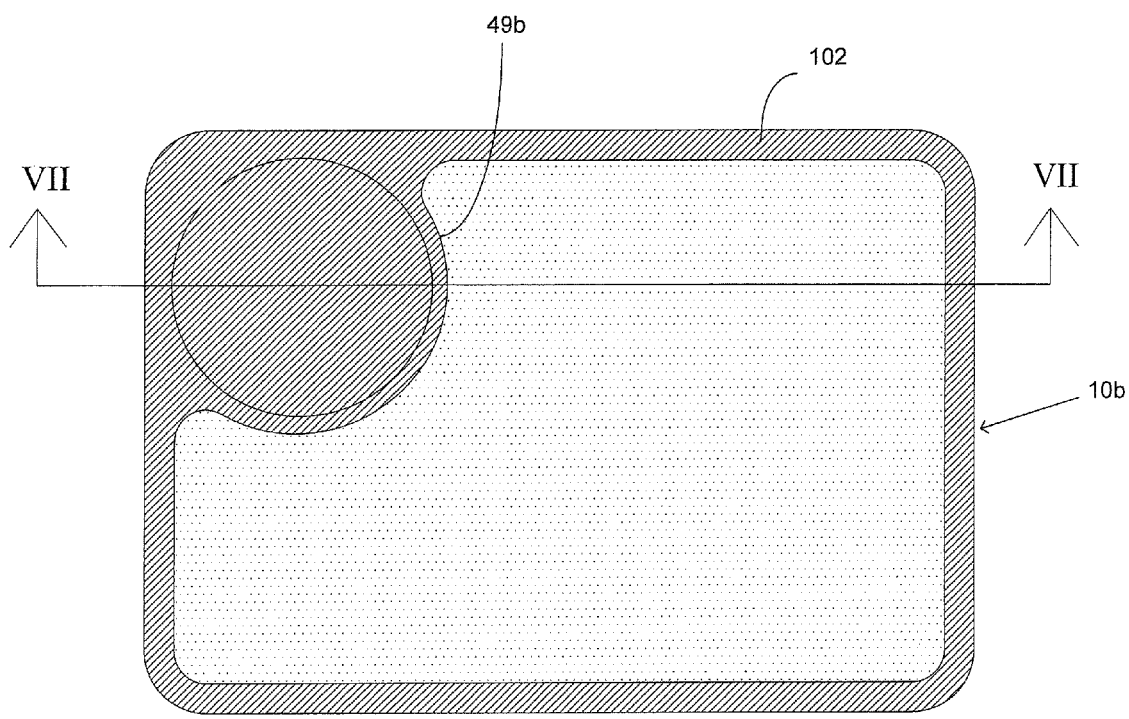
FIG. 6 is a front view of a third embodiment of an exterior rearview mirror element embodying the present invention.
Figure 7:
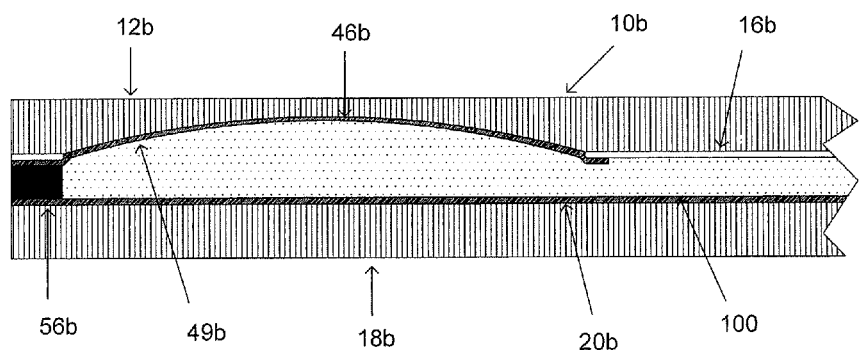
FIG. 7 is a cross-section view of the third embodiment of the exterior rearview mirror element embodying the present invention taken along the line VII-VII of FIG. 6.

The reference numeral 10b (FIGS. 6-7) generally designates another embodiment of the present invention, having a third embodiment for the exterior rearview mirror element. Since exterior rearview mirror element 10b is similar to the previously described exterior rearview mirror element 10, similar parts appearing in FIGS. 1-2 and FIGS. 6-7, respectively, are represented by the same, corresponding reference number, except for the suffix "b" in the numerals of the latter. The third embodiment of the exterior rearview mirror element 10b is substantially identical to the first embodiment of the exterior rearview mirror element 10, except that the reflective coating 49b is contiguous with a spectral filter material 100 covering a periphery 102 of second rear surface 16b of the front element 12b. The spectral filter material 100 is used to cover the seal 56b. Furthermore, the spectral filter material 100 can be reflective to provide the third embodiment of the exterior rearview mirror element 10b with a large reflective surface. The spectral filter material 100 can also extend slightly beyond the extent of the substantially spherical surface 46b as illustrated in FIG. 6. The spectral filter material 100 can be made of chrome and/or aluminum and/or other reflective materials. Using a spectral filter material 100 with an exterior rearview mirror element, its composition, its properties and its application along with properties of the materials adjacent the spectral filter material 100 are described in U.S. Pat. No. 7,372,611 entitled VEHICULAR REARVIEW MIRROR ELEMENTS AND ASSEMBLIES INCORPORATING THESE ELEMENTS, the entire contents of which is hereby incorporated herein by reference.

Figure 8:
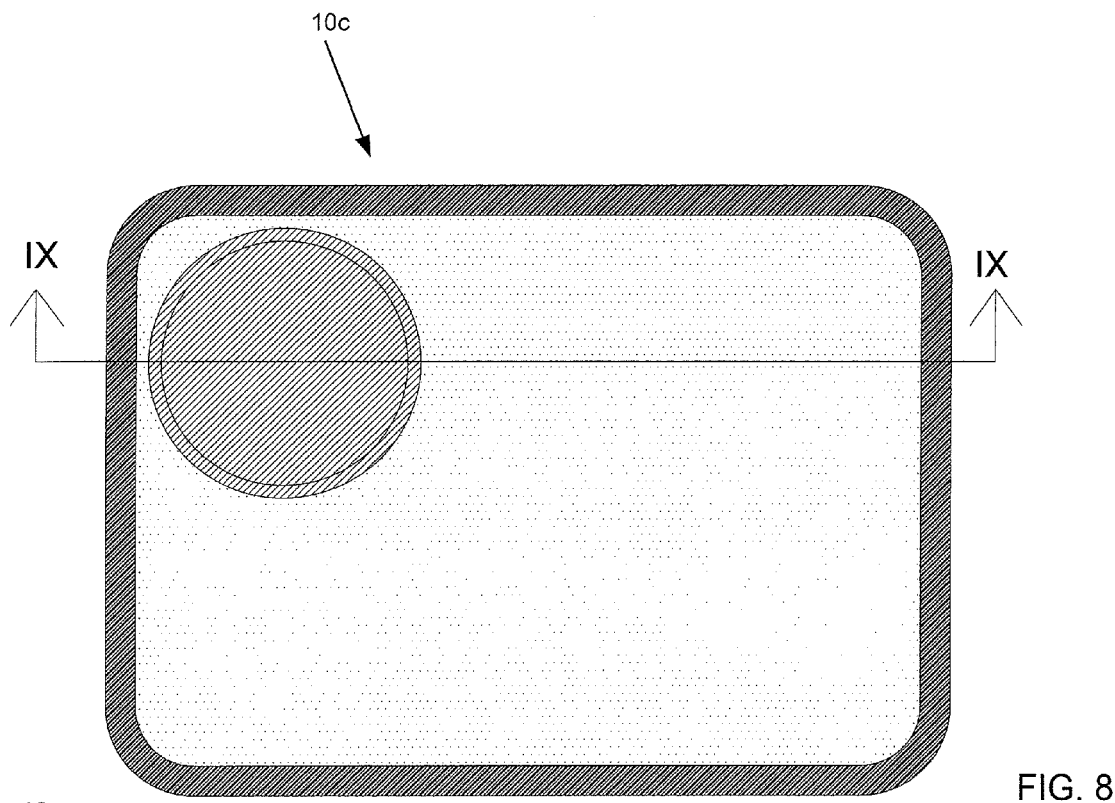
FIG. 8 is a front view of a fourth embodiment of an exterior rearview mirror element embodying the present invention.
Figure 9:
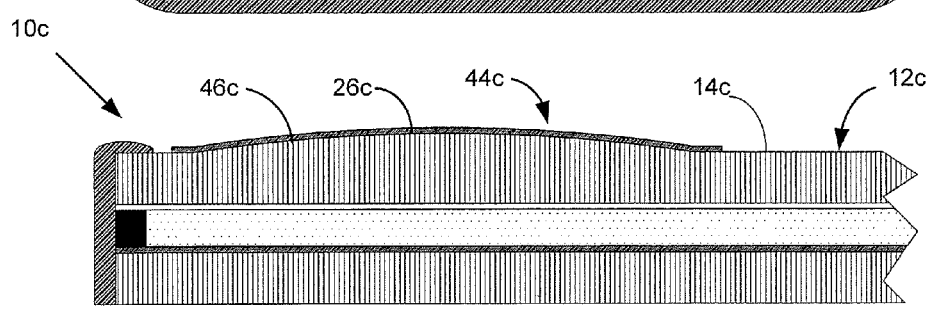
FIG. 9 is a cross-section view of the fourth embodiment of the exterior rearview mirror element embodying the present invention taken along the line IX-IX of FIG. 8.

The reference numeral 10c (FIGS. 8-9) generally designates another embodiment of the present invention, having a fourth embodiment for the exterior rearview mirror element. Since exterior rearview mirror element 10c is similar to the previously described exterior rearview mirror element 10, similar parts appearing in FIGS. 1-2 and FIGS. 8-9, respectively, are represented by the same, corresponding reference number, except for the suffix "c" in the numerals of the latter. The fourth embodiment of the exterior rearview mirror element 10c is substantially similar to the first embodiment of the exterior rearview mirror element 10, except that the spotter optic 26c comprises a convex reflector 44c including a protruding spherical surface 46c protruding from the first front surface 14c of the front element 12c (instead of the spotter optic 26c being at the second rear surface). It is contemplated that the front element 12c having the protruding spherical surface 46c could be formed in any manner. For example, the first front surface 14c of the front element 12c could be etched to form the protruding spherical surface 46c or the protruding spherical surface 46c could comprises a convex reflector 44c adhered or otherwise attached to the first front surface 14c. It is also contemplated that the protruding spherical surface could be included on the third front surface 20 of the rear element 18. In such a situation, the third front surface, at least at the convex reflector, includes a bottom electrical conductor that is reflective. Additionally, any masking material can be located on the first front surface, the second rear surface and/or the third front surface.

Figure 10:
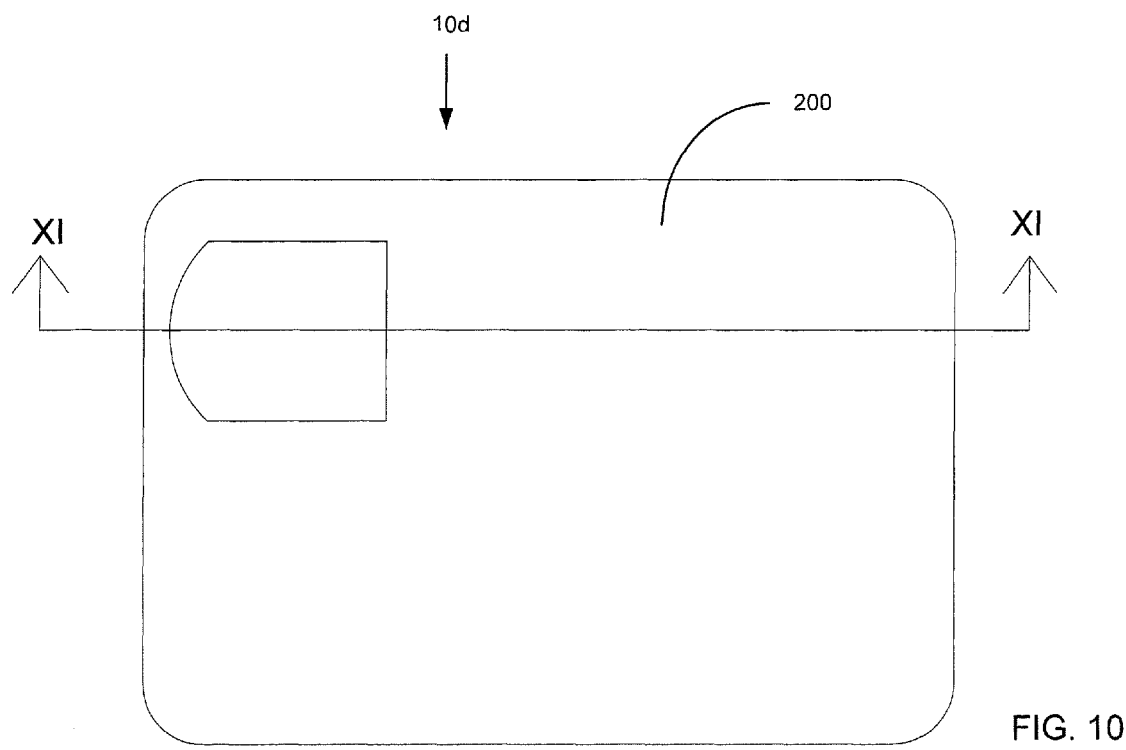
FIG. 10 is a front view of a fifth embodiment of an exterior rearview mirror element embodying the present invention.
Figure 11:
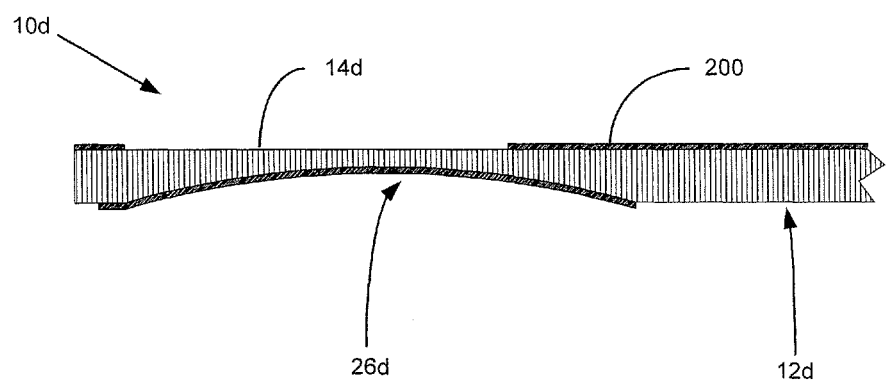
FIG. 11 is a cross-section view of the fifth embodiment of the exterior rearview mirror element embodying the present invention taken along the line XI-XI of FIG. 10.

The reference numeral 10d (FIGS. 10-11) generally designates another embodiment of the present invention, having a fifth embodiment for the exterior rearview mirror element. Since exterior rearview mirror element 10d is similar to the previously described exterior rearview mirror element 10, similar parts appearing in FIGS. 1-2 and FIGS. 10-11, respectively, are represented by the same, corresponding reference number, except for the suffix "d" in the numerals of the latter. The fifth embodiment of the exterior rearview mirror element 10d is substantially identical to the first embodiment of the exterior rearview mirror element 10, except that the fifth embodiment of the exterior rearview mirror element 10d only includes a front element 12d (with no rear element 18 and no electrochromic material 24). Furthermore, the first front surface 14d of the front element 12d includes reflective material 200 except in front of at least a portion of the spotter optic 26d. Moreover, it is contemplated that the reflective material 200 could be used as a masking element positioned over various portions of the convex reflector 26d to prevent an image from being reflected off of the convex reflector 26d at areas where distortion would occur or where a rearward field of view is not desired.

Figure 12:
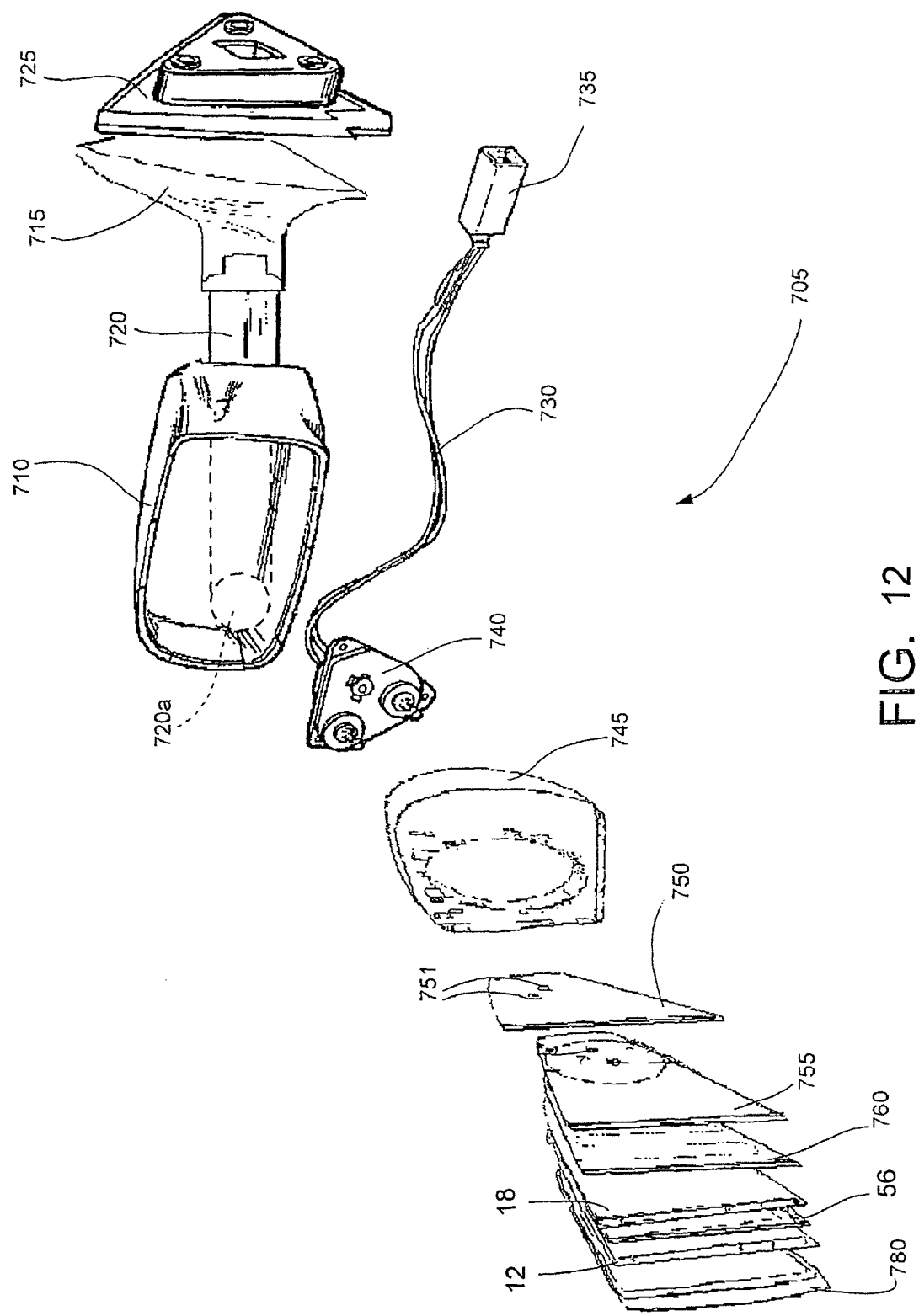
FIG. 12 depicts an exploded view of an exterior rearview mirror assembly having the exterior rearview mirror element of the present invention.

Turning now to FIG. 12, there is shown an exploded view of an exterior rearview mirror assembly 705 having the exterior rearview mirror element 10, 10a or 10b. The exterior rearview mirror assembly 705 has a housing 710 connected to an attachment member 715 via a telescoping extension 720. In at least one embodiment, the telescoping extension 720 comprises a single arm having a linear actuator for extending and retracting the telescoping extension from within the associated vehicle. The telescoping extension 720 may comprise a rack and pinion type linear actuator, an electrical solenoid type linear actuator, a pneumatic piston or a hydraulic actuator. The housing 710 may be configured such that the housing axially pivots about the telescoping extension. Additionally, the telescoping extension may be configured such that the housing may be folded inward toward the associated vehicle and outward away from the associated vehicle. The attachment member 715 is configured to be received by a vehicle mount 725. The vehicle mount may be fixed to a door panel, an A-pillar, a front fender, a window assembly, or any other position where a driver can view the scene generally rearward of the associated vehicle. It should be understood that the telescoping extension may comprise two or more arms and that the housing may be configured to pivot and fold irrespective of the number of arms employed. It should also be understood that the housing may be connected to a non-telescoping extension at a location shown as reference number 720a such that the housing pivots about the connection 720a such that the mirror may be positioned closer or farther from the vehicle as desired. This feature may be accompanied by a power positioning mechanism such that actuation may be performed inside the vehicle. It should be understood that the mirror housing, extension, and attachment member may be configured such that the telescoping, pivoting, and folding requires a manual operation.

A wiring harness 730 with a connector 735 is provided to interface the exterior mirror with associated apparatus located inside the associated vehicle. The wiring harness may be configured to provide extension, folding and pivoting of the housing and may also be configured to provide reflective element control, electrical power, turn signal actuation, mirror heater control, mirror element positioning, light sensor interface, exterior mirror circuit board interface, transceiver interface, information display interface, antenna interface, light source power and control, emergency flasher interface, and all other electrical features as described herein. It should be understood that operator interfaces are provided within the vehicle for each of these features where appropriate.

A mirror element positioner 740 is provided for aligning the associated reflective element within the housing from the interior of the associated vehicle. It should be understood that a corresponding operator interface is provided within the vehicle for positioning of the reflective element.

The positioner 740 is mechanically connected to a carrier 745 for providing a secure structure for supporting and moving of the associated reflective element. Examples of suitable carriers are described in U.S. Pat. Nos. 6,195,194 and 6,239,899, the disclosures of which are incorporated herein in their entireties by reference.

In at least one embodiment, a double-sided adhesive foam 750 is employed to attach the reflective element to the carrier. In certain instances, apertures 751 may be provided in the double-sided adhesive foam for accommodating positioning of various components.

In at least one embodiment, an electrical circuit board 755 is provided in the rearview mirror assembly. The electrical circuit board may comprise a light source such as a turn signal light, a keyhole illuminator, or an outside door area illuminator, as taught in U.S. Pat. No. 6,441,943, the entire disclosure of which is incorporated in its entirety herein by reference, an information display, an antenna, a transceiver, a reflective element control, an outside mirror communication system, a remote keyless entry system, proximity sensors, and interfaces for other apparatus described herein. U.S. Pat. Nos. 6,244,716, 6,523,976, 6,521,916, 6,441,943, 6,335,548, 6,132,072, 5,803,579, 6,229,435, 6,504,142, 6,402,328, 6,379,013, and 6,359,274 disclose various electrical components and electrical circuit boards that may be employed in one or more embodiments, the disclosures of each of these U.S. patents are incorporated herein in their entireties by reference.

In at least one embodiment, a rearview mirror assembly is provided with a heater 760 for improving the operation of the device and for melting frozen precipitation that may be present. Examples of various heaters are disclosed in U.S. Pat. Nos. 5,151,824, 6,244,716, 6,426,485, 6,441,943 and 6,356,376, the disclosures of each of these patents are incorporated in their entireties herein by reference.

In at least one embodiment, the rearview mirror assembly is provided with a bezel 780 for protecting the associated seal from damaging light rays and to provide an aesthetically pleasing appearance. Examples of various bezels are disclosed in U.S. Pat. Nos. 5,448,397, 6,102,546, 6,195,194, 5,923,457, 6,238,898, 6,170,956 and 6,471,362, the disclosures of which are incorporated herein in their entireties by reference.

It is contemplated that the spotter optic 26 could abut an edge of the front element 12 and/or rear element 18 (instead of being located within a central area of the elements as illustrated) such that the spotter optic is not circular. Moreover, it is contemplated that the spotter optic 26 could be non-spherical and/or have a non-circular periphery. Additionally, it is contemplated that the spotter optic 26 could comprise a lens instead of a mirror such that images reflected off of the third front surface 20 or the fourth rear surface 22 pass through a lens that bends the light such that the lens forms the first area 28 that reflects the first zone 32, with the second zone 34 being larger than the first zone 32. Moreover, it is contemplated that a third element could be employed with the spotter optic 26 on the third element such that the third element becomes the rear element and the rear element as discussed above is fully transparent or transparent in front of the spotter optic 26 on the third element. Additionally, adjustment of the relative color of the second area 30, the spectral filter material 100 and the first area 28 can be obtained by various methods. One embodiment is an application of a chrome layer in the second area 30 between successive application of layers of the top electrical conductor 40 (e.g., indium tin oxide ("ITO")). Another embodiment involves adding the top electrical conductor 40 to the second rear surface 14 of front element 12 before the spotter optic 26 is formed and then subsequently forming the spotter optic 26 in the second rear surface 14 and then adding the top electrical conductor 40 in the second area 30 and on the spectral filter material 100. Such techniques are related to those discussed in U.S. Pat. No. 7,372,611, the entire contents of which are hereby incorporated herein by reference. Some predetermined degree of color difference between the first area 28 and the second area 30 may assist in easy and quick location of the spotter optic 26 by the driver, yet color differences that are too great might be regarded as aesthetically undesirable, depending on the hues involved and the magnitude of those differences.

It is to be understood that variations and modifications can be made on the aforementioned structure without departing from the concepts of the present invention. Furthermore, it is to be understood that such concepts are intended to be covered by the following claims unless these claims by their language expressly state otherwise.

We claim:

1. An exterior rearview mirror element comprising:
   a front element having a first front surface and a second rear surface;
   a rear element having a third front surface and a fourth rear surface;
   electrochromic material located between the front element and the rear element;
   a seal abutting the front element and the second element, the seal substantially surrounding the electrochromic material; and
   a spotter optic in contact with the electrochromic material;
   at least a portion of the spotter optic having a first radius of curvature and at least a portion of the first front surface having a second radius of curvature, the first radius of curvature being smaller than the second radius of curvature.

2. The exterior rearview mirror element of claim 1, wherein:
   the rearview mirror element has a first area not including the spotter optic and a second area including the spotter optic, the first area reflecting a first zone and the spotter optic reflecting a second zone; and
   the electrochromic material is configured to reduce the first zone reflectance, but not the second zone reflectance when the electrochromic material is activated.

3. The exterior rearview mirror element of claim 1, wherein:
   wherein the spotter optic is located at the second rear surface of the front element.

4. The exterior rearview mirror element of claim 1, wherein:
the first front surface is substantially planar.

5. The exterior rearview mirror element of claim 1, wherein:
the rearview mirror element has a first area not including the spotter optic and a second area including the spotter optic; and
the difference between an average reflectance of the first area and an average reflectance of the second area is greater than approximately 5 percent.

6. The exterior rearview mirror element of claim 1, wherein:
the fourth rear surface has a substantially continuous radius of curvature.

7. The exterior rearview mirror element of claim 1, wherein:
the spotter optic comprises a convex reflective surface including a reflective material thereon.

8. The exterior rearview mirror element of claim 1, further including:
reflective material on the second rear surface covering the seal to prevent observation of the seal from the first front surface;
wherein the spotter optic comprises a convex reflective surface located at the second rear surface, the convex reflective surface further having the reflective material thereon.

9. The exterior rearview mirror element of claim 8, wherein:
the reflective material covering the seal and the reflective material of the convex reflective surface is contiguous.

10. An exterior rearview mirror element comprising:
a front element having a first front surface and a second rear surface;
a rear element having a third front surface and a fourth rear surface;
electrochromic material located between the front element and the rear element; and
a spotter optic located at the second rear surface of the front element, the spotter optic having a reflective coating;
at least a portion of the spotter optic having a first radius of curvature and at least a portion of the first front surface having a second radius of curvature, the first radius of curvature being smaller than the second radius of curvature;
wherein an electrical potential is applied across a first electrode coating on the second surface and a second electrode coating on the third surface changing an absorption of the electrochromic material in order to reduce a reflection off of the exterior rearview mirror element; and
wherein the reflective coating of the spotter optic forms a portion of the first electrode coating in contact with the electrochromic material.

11. The exterior rearview mirror element of claim 10, wherein:
the rearview mirror element has a first area not including the spotter optic and a second area including the spotter optic, the first area reflecting a first zone and the spotter optic reflecting a second zone; and
the electrochromic material is configured to reduce the first zone reflectance, but not the second zone reflectance when the electrochromic material is activated.

12. The exterior rearview mirror element of claim 10, wherein:
the first front surface is substantially planar.

13. The exterior rearview mirror element of claim 10, wherein:
the rearview mirror element has a first area not including the spotter optic and a second area including the spotter optic, the first area reflecting a first zone and the spotter optic reflecting a second zone; and
the first area has a different reflectance than the second area.

14. The exterior rearview mirror element of claim 10, wherein:
the fourth rear surface has a substantially continuous radius of curvature.

15. The exterior rearview mirror element of claim 10, wherein:
the spotter optic comprises a convex reflective surface having the reflective coating thereon.

16. An exterior rearview mirror element comprising:
a front element having a first front surface and a second rear surface, the second rear surface having a first electrode coating thereon;
a rear element having a third front surface and a fourth rear surface, the third front surface having a second electrode coating thereon;
electrochromic material located between the front element and the rear element; and
a spotter optic located at the second rear surface of the front element, the spotter optic having a reflective coating;
at least a portion of the spotter optic having a first radius of curvature and at least a portion of the first front surface having a second radius of curvature, the first radius of curvature being smaller than the second radius of curvature;
wherein the first electrode coating and the reflective coating abut and overlap such that a line perpendicular to the first front surface of the front element extends through both the first electrode coating and the reflective coating.

17. The exterior rearview mirror element of claim 16, wherein:
the rearview mirror element has a first area not including the spotter optic and a second area including the spotter optic, the first area reflecting a first zone and the spotter optic reflecting a second zone; and
the electrochromic material is configured to reduce the first zone reflectance, but not the second zone reflectance when the electrochromic material is activated.

18. The exterior rearview mirror element of claim 16, wherein:
the first electrode coating and the reflective coating overlap at least 0.5 mm substantially around a perimeter of the spotter optic.

19. The exterior rearview mirror element of claim 16, wherein:
the rearview mirror element has a first area not including the spotter optic and a second area including the spotter optic; and
the difference between the average reflectance of the first area and the average reflectance of the second area is greater than approximately 5 percent.

20. The exterior rearview mirror element of claim 16, wherein:
the fourth rear surface has a substantially continuous radius of curvature.

21. The exterior rearview mirror element of claim 16, wherein:
the spotter optic comprises a convex reflective surface having the reflective coating thereon.

* * * * *